United States Patent
Iizawa et al.

(10) Patent No.: US 8,278,229 B2
(45) Date of Patent: Oct. 2, 2012

(54) COVER COATING COMPOSITION FOR GLASS LINING

(75) Inventors: Yoshihiro Iizawa, Saitama (JP);
Masahiro Shirasaki, Saitama (JP);
Takashi Kawashima, Saitama (JP);
Osamu Mori, Saitama (JP)

(73) Assignee: Ikebukuro Horo Kogyo Co., Ltd., Saitama (JP)

( * ) Notice: Subject to any disclaimer, the term of this patent is extended or adjusted under 35 U.S.C. 154(b) by 0 days.

(21) Appl. No.: 13/359,096

(22) Filed: Jan. 26, 2012

(65) Prior Publication Data

US 2012/0118202 A1    May 17, 2012

Related U.S. Application Data

(63) Continuation of application No. 12/310,023, filed as application No. PCT/JP2007/065163 on Aug. 2, 2007, now Pat. No. 8,168,551.

(30) Foreign Application Priority Data

Aug. 7, 2006  (JP) .................................. 2006-214613

(51) Int. Cl.
*C03C 8/02*      (2006.01)
*C03C 8/00*      (2006.01)
*C03C 8/24*      (2006.01)
*C03C 8/14*      (2006.01)
*C03C 3/093*     (2006.01)
*C03C 3/078*     (2006.01)

(52) U.S. Cl. ................. 501/21; 501/14; 501/15; 501/17; 501/67; 501/72

(58) Field of Classification Search .................... 501/14, 501/15, 16, 17, 18, 21, 26, 65, 67, 69, 72
See application file for complete search history.

(56) References Cited

U.S. PATENT DOCUMENTS

| | | | | |
|---|---|---|---|---|
| 4,537,862 A | * | 8/1985 | Francel et al. | 501/14 |
| 5,308,803 A | * | 5/1994 | Clifford et al. | 501/17 |
| 5,900,380 A | | 5/1999 | Iizawa et al. | |
| 6,174,608 B1 | | 1/2001 | Bertocchi et al. | |
| 2001/0031446 A1 | | 10/2001 | Petticrew | |

(Continued)

FOREIGN PATENT DOCUMENTS

EP          0 819 656          1/1998

(Continued)

OTHER PUBLICATIONS

International Search Report dated Oct. 23, 2007 in the International (PCT) Application PCT/JP2007/065163 of which the present application is the U.S. National Stage.

(Continued)

*Primary Examiner* — Noah Wiese
(74) *Attorney, Agent, or Firm* — Wenderoth, Lind & Ponack, L.L.P.

(57) ABSTRACT

Provided is a cover coating composition for a glass lining comprising a frit constituting the composition which mainly includes 65 to 75 mol % of $SiO_2$, 2 to 8 mol % of $ZrO_2$, 10 to 22 mol % of $R_2O$ where R represents Li, K, or Cs, and 2 to 12 mol % of R'O where R' represents Mg, Ca, Sr, or Ba, and the frit is free of $Na_2O$, and said cover coating composition for a glass lining may further contain a metal fiber.

1 Claim, 1 Drawing Sheet

U.S. PATENT DOCUMENTS

2002/0035025 A1    3/2002  Schweiger et al.
2006/0160690 A1*   7/2006  Cortright et al. ............... 501/15

FOREIGN PATENT DOCUMENTS

| JP | 55-140731   | 11/1980 |
| JP | 6-144963    | 5/1994  |
| JP | 2001-131777 | 5/2001  |
| JP | 2001-224239 | 8/2001  |
| JP | 2001-288027 | 10/2001 |
| JP | 2002-53339  | 2/2002  |
| JP | 2002-258985 | 9/2002  |
| JP | 2003-26443  | 1/2003  |

OTHER PUBLICATIONS

Extended European Search Report dated Jul. 29, 2009 in European Application No. EP 07 79 1843, which is a foreign counterpart of the present application.

* cited by examiner

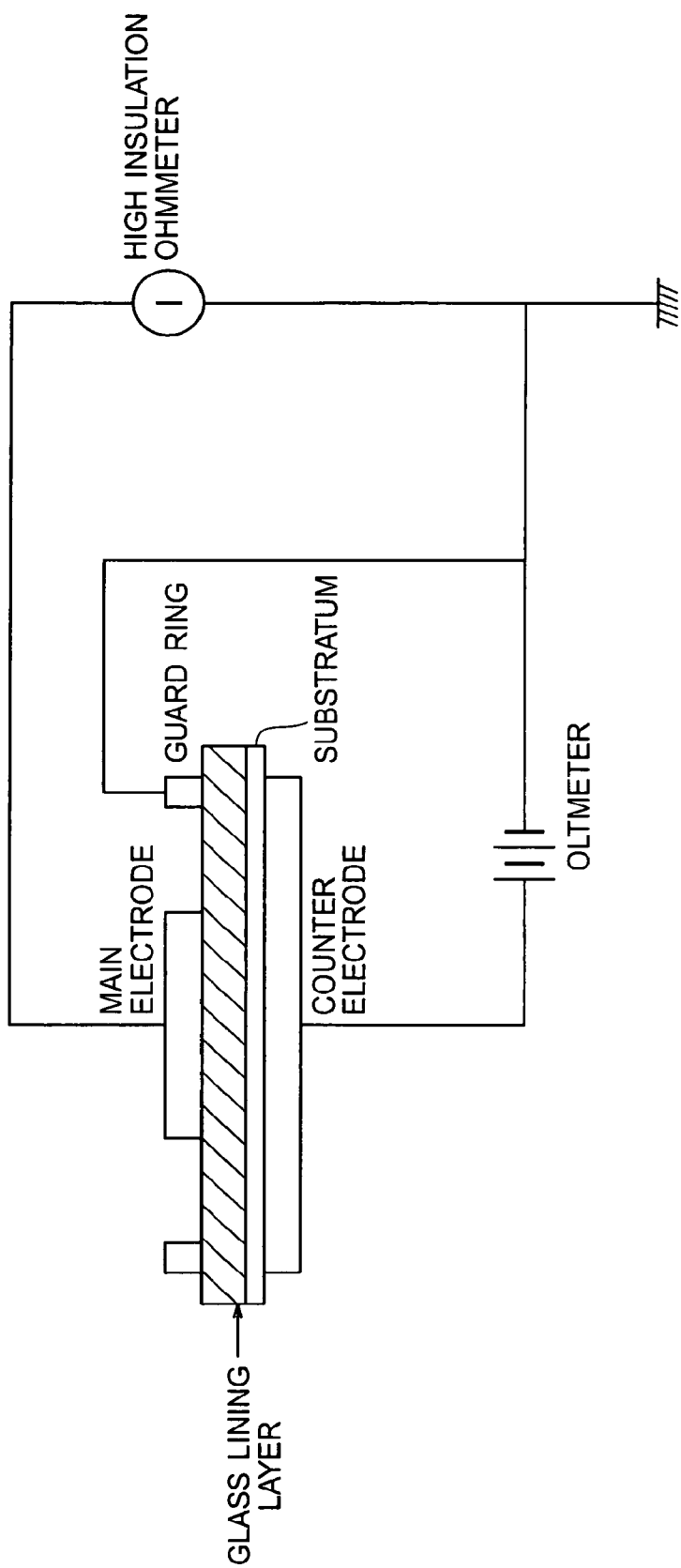

COVER COATING COMPOSITION FOR GLASS LINING

This application is a Continuation of U.S. application Ser. No. 12/310,023, filed Feb. 6, 2009 now U.S. Pat. No. 8,168,551, which is a national stage application of International application No. PCT/JP2007/065163, filed Aug. 2, 2007.

TECHNICAL FIELD

The present invention relates to a composition for a glass lining, and more specifically, to a cover coating composition for a glass lining.

BACKGROUND ART

In the production process of a semiconductor, a metal oxide or the like is doped on a silicon base, an insulating film is provided, for example, by a chemical vapor deposition (CVD) method, wiring is performed by sputtering or plating, and these operations are repeated to form a circuit. With improvements in the degree of integration, wiring line width has decreased to as small as 80 nm or less. In addition, in the production of displays with liquid crystals or organic EL, a thin film transistor (TFT) panel is employed, and wiring having a small width is used in the production process thereof as well.

In the production process of a semiconductor or a TFT panel, a chemical solution formed of hydrofluoric acid, phosphoric acid, hydrochloric acid, sulfuric acid, ammonia, or the like, and a resist solution for wiring are used. However, there arise the following problems: if alkali metal ions such as sodium, lithium, potassium, or rubidium ions contaminate those solutions, the wiring may be destroyed; and if the metal ions contaminate the resist solution, the metal ions form shadows on a resist pattern to disconnect the wiring. In particular, sodium components of those alkali metals remarkably influence the yield in semiconductor production, and hence sodium components must be avoided strictly in the semiconductor production process.

Accordingly, in the production process of the chemical solution, a reactor can and pipes formed of a tetrafluoroethylene-perfluorovinyl ether resin (PFA) or a tetrafluoroethylene resin (PTFE) are used in view of preventing metal components from eluting. However, because the resin is softened in a high temperature system, an inorganic material, i.e. a quartz glass free of sodium components, is used.

Here, in a conventional production process of chemicals, a metal reactor body having a contact area coated with a glassy material, so-called a glass-lined device can easily produce a large volume apparatus, and hence the device is widely employed. The glass lining composition used in the glass-lined device is mainly formed of silicon dioxide ($SiO_2$) and further contains $Na_2O$ in order to adjust the thermal expansion coefficient with the base metal, decrease the temperature when the glass melts, and secure the solubility of plural components. That is, the $Na_2O$ modifies the glass network structure of the glass lining layer, cuts the $SiO_2$ network structure, and acts to (i) increase the linear thermal expansion coefficient and (ii) enhance the readily-soluble property, and thus $Na_2O$ is an essential component of the glass lining composition. However, sodium components easily elute from a glass lining layer containing $Na_2O$, and contaminate a chemical solution or the like in the production process of the chemical solution, and hence a conventional glass-lined device cannot be used in producing a chemical solution or the like used in the production process for semiconductors or TFT panels.

On the other hand, quartz glass is free of elution of sodium components, but it is extremely difficult to apply a quartz glass coating to a large volume apparatus, because, the quartz glass has a softening point of as high as 1,650° C. Hence, when the quartz glass is coated on the contact area of the metal reactor body or the like, the metal is oxidized and impaired, and the quartz glass is impaired upon cooling because of the large differences in thermal expansion between the metal reactor body and the quartz glass.

From the foregoing, it has been proposed that a silica coating layer is provided on the surface of a glass lining layer of a glass-lined device. For example, Patent Document 1 discloses a production method for a glass lining product including producing a product covered with a glass lining in which a glass lining layer (2) is formed on a surface of a base material (1), characterized by including forming a silica coating layer by coating $SiO_2$ by a sol-gel method on the surface of the glass lining layer (2) to produce the product covered with a glass lining (claim 1); the production method for a glass lining product according to claim 1 characterized in that the means for coating $SiO_2$ by a sol-gel method is a means for spraying a solution obtained by adding alkoxides of silicone and polyethylene glycol to the glass lining layer (2), and then drying and baking the resultant (claim 2); and a production method for a glass lining product including producing a product covered with a glass lining in which a glass lining layer (2) is formed on a base material (1), characterized by including forming a silica coating layer (3) by applying $SiO_2$ on the surface of the lining glass layer (2) (Claim 6). In addition, there is also described, in paragraphs [0014] to [0015] in Patent Document 1, the thickness of the silica coating layer is 0.5 to 10 μm.

In addition, Patent Document 2 discloses a conductive glass lining composition including a frit, characterized by including 0.05 to 1.5 parts by mass of a metal fiber having a diameter of 0.5 to 30 μm, a length of 1.5 to 10 mm, and a shape ratio of the length to the diameter of 50 or more with respect to 100 parts by mass of the frit (claim 1); and the conductive glass lining composition according to claim 1, in which the metal fiber includes one or more kinds selected from the group consisting of stainless steel-based metals, noble metal-based metals, and alloys of platinum and platinum group metals (claim 2). In addition, claim 3 in Patent Document 2 describes the frit includes 8 to 22 mass % of $Na_2O$.

Further, Patent Document 3 discloses a conductive glass lining composition including a frit, and characterized by including 0.001 to 0.05 part by mass of a metal fiber having a diameter of 0.01 μm or more and 0.5 μm or less, a length of 0.5 to 1,500 μm, and a shape ratio of the length to the diameter of 50 or more with respect to 100 parts by mass of the frit (claim 1); and the conductive glass lining composition according to claim 1, in which the metal fiber includes one or more kinds selected from the group consisting of noble metal-based metals and alloys of platinum and platinum group metals (claim 2)". In addition, claim 3 in Patent Document 3 describes the frit includes 8 to 22 mass % of $Na_2O$.

Patent Document 1: JP 2001-131777 A
Patent Document 2: JP 10-81594 A
Patent Document 3: JP 11-116273 A

DISCLOSURE OF THE INVENTION

Problem to be Solved by the Invention

However, the glass lining product obtained by the production method for a glass lining product as described in Patent Document 1 has a silica coating layer (3) on the surface thereof, and hence is free of elution of a sodium component or the like. However, the thickness of the silica coating layer (3) is as extremely small as 0.5 to 10 μm, and hence pin holes or the like are easily generated. In addition, the adhesion force of the silica coating layer (3) to the lining glass layer (2) is not sufficient, and hence peeling or the like easily occurs and there is also a problem in durability. Therefore, it is impossible to stably prevent sodium components or the like from eluting from the glass lining product over a long period. Further, if the thickness of the silica coating layer (3) is increased, peeling easily occurs due to stress, so the pin holes or the like cannot be prevented by increasing the thickness of the coating layer.

In addition, in the conductive glass lining composition described in Patent Documents 2 and 3, the frit contains 8 to 22 mass % of $Na_2O$, and elution of the sodium components or the like is not taken into consideration.

Accordingly, an object of the present invention is to provide a cover coating composition for a glass lining capable of providing a glass-lined device wherein no sodium components are eluted.

Means for Solving the Problems

As a result of the inventors of the present invention extensively studying to solve the above problems, the inventors have found that, even if a sodium component is not added to a cover coating composition for a glass lining constituting a glass-lined device, a glass lining having favorable characteristics can be enameled, to thereby complete the present invention.

That is, a cover coating composition for a glass lining of the present invention is comprised of a frit constituting the composition, which mainly includes 65 to 75 mol % of $SiO_2$, 2 to 8 mol % of $ZrO_2$, 10 to 22 mol % of $R_2O$ where R represents Li, K, or Cs, and 2 to 12 mol % of R'O where R' represents Mg, Ca, Sr, or Ba, and the frit is free of $Na_2O$.

In addition, a cover coating composition for a glass lining of the present invention is characterized in that the frit includes one or more kinds selected from the group consisting of $TiO_2$, $Al_2O_3$, $La_2O_3$, $B_2O_3$, and ZnO.

Further, a cover coating composition for a glass lining of the present invention is characterized in that a content of $TiO_2$ is in a range of 0.1 to 4 mol %, a content of $Al_2O_3$ is in a range of 0.1 to 4 mol %, a content of $La_2O_3$ is in a range of 0.1 to 4 mol %, a content of $B_2O_3$ is in a range of 0.1 to 4 mol %, and a content of ZnO is in a range of 0.1 to 4 mol %, and in a case where two or more kinds are used in combination, a total amount thereof is in a range of 0.2 to 5 mol %.

In addition, a cover coating composition for a glass lining of the present invention is characterized by including up to 3 mass % of one or more kinds of coloring components selected from CoO, $Sb_2O_3$, $Cr_2O_3$, $Fe_2O_3$, $BnO_2$, and $CeO_2$ in terms of $Fe_2O_3$ with respect to 100 mass % of the frit.

Further, a cover coating composition for a glass lining of the present invention is characterized in that up to 5 mol % of each of $SiO_2$, $Al_2O_3$, and CaO components are used in a form of a fluoride.

In addition, a cover coating composition for a glass lining of the present invention is characterized in that a linear thermal expansion coefficient (100 to 400° C.) is in a range of 85 to $110 \times 10^{-7}$° $C.^{-1}$.

Further, a cover coating composition for a glass lining of the present invention is characterized by further including 0.01 to 1.5 parts by mass of a metal fiber having a diameter of 0.1 to 30 μm, a length of 0.005 to 3 mm, and a shape ratio of the length to the diameter of 50 or more with respect to 100 parts by mass of the frit.

In addition, a cover coating composition for a glass lining of the present invention is characterized in that the metal fiber includes one or more kinds selected from the group consisting of noble metal-based metals and alloys of platinum and platinum group metals.

Effects of the Invention

According to the present invention, an effect of providing a cover coating composition for a glass lining, having various characteristics equal to or better than those of a conventional cover coating composition for a glass lining to which a sodium component is added, and is capable of enameling a glass lining layer which is free of elution of the sodium component, can be obtained.

BRIEF DESCRIPTION OF THE DRAWING

FIG. 1 is a schematic drawing of a resistance measurement method by a three-terminal method to measure volume resistivity of the present invention.

BEST MODE FOR CARRYING OUT THE INVENTION

In the present invention, no sodium component is added or blended in a frit constituting a cover coating composition for a glass lining, so the content of the sodium component in the enamel composition is only the amount of unavoidable impurities due to another blended raw material, whereby elution of the sodium component from the glass lining enameling layer is prevented.

In the present invention, the frit contains, as base compositions, $SiO_2$ in the range of 65 to 75 mol %, $ZrO_2$ in the range of 2 to 8 mol %, $R_2O$ in the range of 10 to 22 mol % where R represents Li, K, or Cs, and R'O in the range of 2 to 12 mol % where R' represents Mg, Ca, Sr, or Ba. Here, a $SiO_2$ content exceeding 75 mol % is not preferred because the cover coating composition for a glass lining has high viscosity and a linear thermal expansion coefficient becomes less than $85 \times 10^{\circ}$ $C.^{-1}$. In addition, a content of less than 65% is not preferred because acid resistance and water resistance of the cover coating composition for a glass lining are impaired. Note that a favorable content of $SiO_2$ is in the range of 68 to 71 mol %. In addition, a $ZrO_2$ content exceeding 8 mol % is not preferred because the cover coating composition for a glass lining easily crystallizes and has high viscosity. In addition, a content of less than 2 mol % is not preferred because water resistance and alkali resistance of the cover coating composition for a glass lining are impaired. Note that a favorable content of $ZrO_2$ is in the range of 3 to 6 mol %. Further, a $R_2O$ content exceeding 22 mol % is not preferred because water resistance of the cover coating composition for a glass lining is impaired. In addition, a content of less than 10 mol % is not preferred because the cover coating composition for a glass lining has high viscosity. Note that a favorable content of $R_2O$ is in the range of 15 to 19 mol %. In addition, a R'O content exceeding 12 mol % is not preferred because acid resistance of the cover coating composition for a glass lining is impaired. In addition, a content of less than 2 mol % is not preferred because water resistance of the cover coating composition for a glass lining is impaired. Note that a favorable content of R'O is in the range of 5 to 10 mol %.

Moreover, in the present invention, the frit may include one or more kinds selected from the group consisting of $TiO_2$, $Al_2O_3$, $La_2O_3$, $B_2O_3$, and ZnO. Those components prevent phase splitting and crystallization during firing of the glass lining, and are fixed tightly in a glass network structure to thereby pack and tighten the network. Therefore, those components function to improve the water resistance ability and suppress generation of bubbling.

Here, the content of $TiO_2$ is in the range of 0.1 to 4 mol % and preferably in the range of 1 to 4 mol %, the content of $Al_2O_3$ is in the range of 0.1 to 4 mol % and preferably in the range of 1 to 4 mol %, the content of $La_2O_3$ is in the range of 0.1 to 4 mol % and preferably in the range of 1 to 4 mol %, the content of $B_2O_3$ is in the range of 0.1 to 4 mol % and preferably in the range of 1 to 4 mol %, and the content of ZnO is in the range of 0.1 to 4 mol % and preferably in the range of 1 to 4 mol %, and in the case where two or more kinds are used in combination, the total amount is in the range of 0.2 to 5 mol % and preferably 1 to 5 mol %. Note that, the content and the total content of those components exceeding the upper limits are not preferred because the melting point of the frit becomes high and the solubility is degraded. In addition, the content and the total content below the lower limits are not preferred because an addition effect is not exhibited, which is not preferred.

Further, the frit may be blended with up to 3 mass % of one or more kinds of coloring components selected from the group consisting of CoO, $Sb_2O_3$, $Cr_2O_3$, $Fe_2O_3$, $SnO_2$, and $CeO_2$ in terms of $Fe_2O_3$ with respect to 100 mass % of the frit. Here, the blending amount of the coloring component exceeding 3 mass % in terms of $Fe_2O_3$ is not preferred because the acid resistance is impaired and bubbling phenomenon upon firing occurs.

Note that, in the present invention, in order to promote the melting of the frit, up to 5 mol % of each of $SiO_2$, $Al_2O_3$, and CaO components described above may also be used in the form of a fluoride. Note that $K_2SiF_6$, $K_3AlF_6$, $CaF_2$, and the like, may be used as the fluoride.

In addition, to impart conductivity to the cover coating composition for a glass lining of the present invention, a metal fiber can be blended. The diameter of the usable metal fiber is in the range of 0.1 to 30 µm and preferably in the range of 0.2 to 10 µm. Here, a metal fiber diameter of less than 0.1 µm is not preferred because processing of the metal fiber itself is difficult and the cost is increased. In addition, a diameter exceeding 30 µm is not preferred because slip viscosity as the cover coating composition becomes poor, and spray application property is remarkably degraded.

Further, the length of the metal fiber is in the range of 0.005 to 3 mm and preferably in the range of 0.01 to 2 mm. Here, a metal fiber length of less than 0.005 mm is not preferred because cutting of the metal fiber itself is difficult. In addition, a length exceeding 3 mm is not preferred because slip viscosity as the cover coating composition becomes poor and spray application property is remarkably degraded.

In addition, the shape ratio of the length to the diameter of the metal fiber is 50 or more. If the shape ratio of the length to the diameter of the metal fiber is less than 50, conductivity of the enamel composition cannot be improved as long as a large amount of the metal fiber is not blended, which is not preferred.

In the cover coating composition for a glass lining of the present invention, the dimension of the metal fiber that can be blended is in the above-mentioned range. When the metal fiber is mixed with the frit, the metal fiber is pulverized and cut and thus a slight amount of a metal fiber having a smaller dimension than the above-mentioned range may be mixed in when the cover coating composition is enameled. However, the conductivity of the obtained enameled layer of the cover coating composition is not affected even in the presence of the metal fiber.

The metal fiber is one or more kinds selected from the group consisting of noble metal-based metals and alloys of platinum and platinum group metals. As the noble metal-based metal fiber, an Ag fiber (volume resistivity: $1.6 \times 10^{-6}$ Ωcm), an Au fiber (volume resistivity: $2.4 \times 10^{-6}$ Ωcm), a Pt fiber (volume resistivity: $10.6 \times 10^{-6}$ Ωcm), and the like may be used. Further, as the alloy fibers of platinum and platinum group metals, an alloy of Pt and Pd, Ir, Rh, Os, or Ru may be used.

Note that the amount of the metal fiber added to the frit is 0.01 to 1.5 parts by mass and preferably 0.05 to 1.0 part by mass with respect to 100 parts by mass of the frit. An addition amount of the metal fiber of less than 0.01 part by mass is not preferred because significant improvement of the conductivity cannot be expected. In addition, an addition amount exceeding 1.5 parts by mass is not preferred because the slip viscosity becomes poor and spray application property is remarkably degraded. Further, if the amount of the metal fiber added is in the above-mentioned range, a glass lining having favorable quality can be obtained without bubbling and unevenness phenomenon on the firing side of the glass lining.

The cover coating composition for a glass lining having the above-mentioned composition can be enameled as an enamel composition for a glass lining by adding an additive common to the frit (for example, clay, carboxymethyl cellulose, barium chloride) or the like, and a predetermined amount of water, ethyl alcohol, or the like to a prepare a slip.

The glass lining layer which is enameled using the cover coating composition for a glass lining of the present invention has a linear thermal expansion coefficient (100 to 400° C.) of the range of 85 to $100 \times 10^{-7}$ °C.$^{-1}$ and can be enameled tightly on the base material through a ground coat.

Further, the cover coating composition for a glass lining of the present invention can be favorably used as an enamel composition in a device formed of a glass lining for producing a chemical solution or the like for which contamination by a sodium component is not suitable.

EXAMPLES

Hereinafter, the enamel composition for a glass lining of the present invention is further described by way of examples.

Example 1

Frit was compounded at the compound ratios shown in Table 1 below.

TABLE 1

|  |  | Product of the present invention | | Comparative product |
|---|---|---|---|---|
|  |  | (1) | (2) | (3) |
| Compound (mol %) | $SiO_2$ | 70 | 70 | 70 |
|  | $ZrO_2$ | 5 | 5 | 5 |
|  | $R_2O$ | 18 | 17 | 20 |
|  | ($Na_2O$) | (—) | (—) | (15) |
|  | ($K_2O + Li_2O + Cs_2O$) | (18) | (17) | (5) |
|  | R'O | 5 | 3 | 5 |
|  | (CaO + MgO + BaO) |  |  |  |
|  | $TiO_2$ |  | 2 | — |
|  | ($Al_2O_3 + La_2O_3 + B_2O_3$) | 2 | 3 | — |

TABLE 1-continued

|  |  | Product of the present invention | | Comparative product |
|---|---|---|---|---|
|  |  | (1) | (2) | (3) |
| Corrosion resistance measured by loss in mass ($g/m^2$/24 hours) | Gas phase | 0.25 | 0.18 | 0.30 |
|  | Liquid phase | 0.12 | 0.10 | 0.15 |
| Linear thermal expansion coefficient (100-400° C.) ($\times 10^{-7}$ °$C.^{-1}$) | | 102 | 85 | 97 |

Next, to a frit having the following composition: 55 mol % of $SiO_2+TiO_2+ZrO_2$; 21 mol % of $Na_2O+K_2O+LiO_2$; 6 mol % of CaO+BaO; 15.5 mol % of $B_2O_3+Al_2O_3$; and 2.5 mol % of $CoO+NiO+MnO_2$, 7 mass % (outer percentage) of clay, 33 mass % (outer percentage) of an aqueous solution of carboxymethyl cellulose (concentration: 1 mass %), 5 mass % (outer percentage) of an aqueous solution of sodium nitrite (concentration: 0.3 mass %) with respect to 100 mass % of the frit, and water were added to prepare a slip of a ground coating composition. The slip was enameled on a round plate base material (material: SPCC carbon steel plate) having a diameter of 105 mm and a thickness of 1 mm, and fired at 860° C. for 20 minutes, whereby a ground coat layer having, a thickness of 0.3 to 0.4 mm was obtained.

Next, with respect to 100 mass % of the product of the present invention and the comparative product, 7 mass % (outer percentage) of clay, 33 mass % (outer percentage) of an aqueous solution of carboxymethyl cellulose (concentration: 1 mass %), 0.1 mass % (outer percentage) of an aqueous solution of barium chloride (concentration: 1 mass %), and water were added to the frit to prepare a slip of an enamel composition. On the ground coat layer produced as described above, the slip was enameled, and fired at 800° C. for 20 minutes, followed by repeating those operations three times. Thus, an enameled layer having a thickness of 0.6 to 0.7 mm was formed. Note that the total thickness of the ground coat layer and the cover coat layer was about 1.0 mm.

The water resistance and linear thermal expansion coefficient of the obtained test sample were measured according to the following operation. Table 1 shows the obtained results side-by-side.

<Water Resistance>

The water resistance was measured using a boiling citric acid test device as defined in JIS R 4301. First, the test sample was washed with pure water and then washed with ethanol. After that, the test sample was dried in the desiccator at 110±5° C. for about 2 hours, followed by cooling for 2 hours in a desiccator. The weighed mass of the obtained test sample was defined as $m_1$. Next, the test sample was mounted in the device, and tested using ion exchanged water for 7 days in a boiling state. After that, the test sample was taken from the device, and rubbed three times with a soft sponge while being washed with water. The test sample was dried in a desiccator at 110±5° C. for about 2 hours, followed by cooling for 2 hours in the desiccator. The weighed mass of the obtained test sample was defined as $m_2$. From the obtained results, the corrosion resistance measured by loss in mass (A) was determined by the following equation.

$$A=[(m_1-m_2)/B]/7$$

A: corrosion resistance measured by loss in mass ($g/m^2$/24 hours)
B: area of test sample in contact with ion exchanged water ($m^2$)
$m_1$: mass of test sample before test (g)
$m_2$: mass of test sample after test (g)

<Linear Thermal Expansion Coefficient>

The ground coat layer and the cover coat layer were peeled off from the test sample produced in the same manner as describe above, and a piece of the cover coat layer was collected. The piece of the cover coat layer was melted again at 800° C. over 20 minutes, whereby a test sample having a diameter of 2 to 4 mm and a thickness of 12 mm was obtained. The linear thermal expansion coefficient was measured by a thermal dilatometer (TD-5000S) manufactured by Bruker AXS K.K.

Next, an elution test in ultra pure water at 80° C. (specific resistance: 2 MΩ) was performed for 30 days using a boiling citric acid test device as defined in JIS R 4301. After the test, the concentrations of $Si^{4+}$, $Na^+$, $K^+$, and $Li^+$ in the ultra pure water used in the elution test were measured by an atomic absorption analysis. Table 2 shows the obtained results. Note that "<0.01" in the column of $Na^+$ represents a concentration equal to or lower than the detection limit.

TABLE 2

|  | Product of the present invention | | Comparative product |
|---|---|---|---|
|  | (1) | (2) | (3) |
| $Si^{4+}$ (mg/L) | 0.18 | 0.15 | 0.29 |
| $Na^+$ (mg/L) | <0.01 | <0.01 | 0.16 |
| $K^+$ (mg/L) | 0.1 | 0.08 | 0.13 |
| $Li^+$ (mg/L) | 0.04 | 0.03 | 0.05 |

In addition, to compare elution components at ppb level between the product of the present invention and the comparative product, an elution test in ultra pure water at 50° C. (specific resistance: 18 MΩ) was performed for 120 hours.

As a test sample, an iron-based round bar (low carbon steel) having a diameter of 13 mm and a length of 80 mm and having the entire area of the bar applied with a glass lining in the same process as described above was used. 200 ml of ultra pure water was added to a container made of all-PTFE as a test container and elution was performed in a warm water bath at 50° C.

After the test, the concentrations of Na, Ca, K, Ba, and Li in the ultra pure water were measured by inductively coupled plasma-mass spectrometry (ICP). Table 3 shows the obtained results. Note that "<0.01" in the columns of Ca and Ba represents a concentration equal to or lower than the detection limit.

TABLE 3

|  | Product of the present invention | | Comparative product |
|---|---|---|---|
|  | (1) | (2) | (3) |
| Na (μg/ml) | 0.06 | 0.07 | 0.73 |
| Ca (μg/ml) | <0.01 | <0.01 | <0.01 |
| K (μg/ml) | 0.02 | 0.02 | 0.05 |
| Ba (μg/ml) | <0.01 | <0.01 | <0.01 |
| Li (μg/ml) | 0.03 | 0.05 | 0.09 |

It was confirmed that the elution amount of Na of the product of the present invention was 1/10 or less compared to the comparative product and the elution amounts of K and Li of the product of the present invention were clearly smaller than those of the comparative product.

Further, the same test sample as described above was used and the elution test was performed in the same manner as described above except that 0.7 mass % of an aqueous solution of hydrochloric acid was used and elution was performed in a warm water bath at 80° C. Then, the concentrations of Na, Ca, K, Li, Mg, Zn, and Al in ultra pure water after the test were measured by ICP. Table 4 shows the obtained results. Note that "<0.01" in the columns of Ca, Mg, and Zn and "<0.02" in the column of Al represent a concentration equal to or lower than the detection limit.

TABLE 4

|  | Product of the present invention | | Comparative product |
|---|---|---|---|
|  | (1) | (2) | (3) |
| Na (μg/ml) | 0.07 | 0.07 | 4.0 |
| Ca (μg/ml) | <0.01 | <0.01 | 0.20 |
| K (μg/ml) | 0.03 | 0.04 | 0.20 |
| Li (μg/ml) | 0.04 | 0.03 | 0.10 |
| Mg (μg/ml) | <0.01 | <0.01 | <0.01 |
| Zn (μg/ml) | <0.01 | <0.01 | <0.01 |
| Al (μg/ml) | <0.02 | <0.02 | <0.02 |

The elution amounts of Na, Ca, K, and Li of the product of the present invention were confirmed to be small in severe conditions such as 0.7 mass % of an aqueous solution of hydrochloric acid and a temperature of 80° C.

Example 2

With respect to 100 parts by mass of the products of the present invention (1) and (2) described above and the ground coat composition, platinum fiber having a diameter of 0.6 μm and a length of 2 mm was added at the ratio described in Table 5 to produce an enamel composition.

Next, the platinum fiber-containing enamel composition was enameled on a round plate on which a ground coat had been enameled in the same application method as in Example 1 under the conditions described in Table 5 below, whereby an enameled layer was formed.

The volume resistivity of the obtained glass lining was determined by a resistance measurement method using the three-terminal method shown in FIG. 1. Table 5 shows the obtained results side-by-side. Note that, for comparison, the volume resistivity of a glass lining obtained by enameling an enamel composition of comparative product (3) under the conditions described in Table 5 was measured in the same manner.

TABLE 5

|  | Product of the present invention | | Comparative product |
|---|---|---|---|
|  | (4) | (5) | (3) |
| Ground coat + Pt fiber (part by mass) One-time application Firing at 850° C. for 15 minutes | 0.2 | 0.2 | None |
| Glaze + Pt fiber (part by mass) Three-time application Firing at 800° C. for 15 minutes | 0.4 | 0.6 | None |
| Thickness of ground coat (mm) | 0.30 | 0.35 | 0.35 |
| Thickness of cover coat (mm) | 1.10 | 1.25 | 1.15 |
| Total thickness (mm) | 1.40 | 1.60 | 1.50 |
| Volume resistivity (Ωcm) | $1.3 \times 10^6$ | $1.9 \times 10^4$ | $2.3 \times 10^{13}$ |
| Conductivity | ○ | ◉ | x |

In Table 5, ◉, ○, and x represent extremely favorable conductivity, favorable conductivity, and poor conductivity, respectively.

Note that, with respect to the products of the present invention 4 and 5, the boiling citric acid test, the elution test in ultra pure water, and the elution test in an aqueous solution of hydrochloric acid were performed as in Example 1, and the same results as in Example 1 were obtained. The elution amount of sodium components was confirmed to be extremely small.

The invention claimed is:

1. A cover coating composition for a glass lining, comprising a frit,
   wherein the frit
   is free of $Na_2O$
   and
   consists of 65 to 75 mol % of $SiO_2$, 2 to 8 mol % of $ZrO_2$, 0.1 to 4 mol % of $La_2O_3$, 10 to 22 mol % of $R_2O$ where R represents Li, K, or Cs, and 2 to 12 mol % of R'O where R' represents Mg, Ca, Sr, or Ba,
   and
   optionally one or more members selected from the group consisting of $TiO_2$, $Al_2O_3$, $B_2O_3$, and ZnO.

* * * * *